United States Patent [19]

Komiyama et al.

[11] Patent Number: 4,575,023
[45] Date of Patent: Mar. 11, 1986

[54] MAGNETIC TAPE CASSETTE

[76] Inventors: Choji Komiyama; Seiji Odate, both of Kanagawa, Japan

[21] Appl. No.: 634,008

[22] Filed: Jul. 24, 1984

[30] Foreign Application Priority Data

Aug. 10, 1983 [JP] Japan .................... 58-123219[U]

[51] Int. Cl.⁴ ................ G03B 1/04; G11B 15/32; B65H 23/04
[52] U.S. Cl. ................... 242/199; 242/76; 226/196
[58] Field of Search ............ 242/76, 197–200; 226/189, 190, 196; 360/130.2–130.24, 132, 137

[56] References Cited

U.S. PATENT DOCUMENTS

| | | | |
|---|---|---|---|
| 3,658,227 | 4/1972 | Stephens | 226/196 |
| 3,991,956 | 11/1976 | Machida | 242/199 |
| 4,096,538 | 6/1978 | Oishi | 360/132 |
| 4,313,551 | 2/1982 | Umehara | 226/196 |
| 4,441,133 | 4/1984 | Ogawa et al. | 360/130.22 |

Primary Examiner—Leonard D. Christian
Attorney, Agent, or Firm—Sughrue, Mion, Zinn, Macpeak and Seas

[57] ABSTRACT

A magnetic tape cassette in which loop formation during slackening of the tape is prevented and the tape is wound on the winding hub without being displaced laterally, thereby preventing jamming of the cassette and deformation of the tape. The cassette includes a pair of hubs on which the magnetic tape is wound, two guide rollers, one at either end of an opening formed in the front of the cassette, and two inner guides, one provided between each of the guide rollers and a respective one of the hubs. Each inner guide includes a cylindrical barrel having a tape sliding surface, and a protrusion extending from the cylindrical barrel. The protrusion, which has a tape sliding surface wider than the tape, is turnable rearwardly of the cassette. A tape guide groove is formed in the tape sliding surface of the cylindrical barrel having a width slightly greater than that of the tape. Stops engage the protrusion so that, on a tape winding side, the tape is made to slide in the guide groove, while on the tape supplying side, when the tape slackens, the protrusion engages with the tape to prevent the formation of a loop.

3 Claims, 5 Drawing Figures

MAGNETIC TAPE CASSETTE

BACKGROUND OF THE INVENTION

The present invention relates to magnetic tape cassettes, and more particularly to a magnetic tape cassette in which tape guides closest to a pair of hubs on which a magnetic tape is wound are improved.

In a conventional magnetic tape cassette for audio recording, the magnetic tape is wound on a pair of hubs and runs along an opening formed in the front of the cassette. The tape is laid in the cassette to run while being guided by guide rollers provided at both ends of this opening. Guides such as M-shaped ribs and head pins are provided between the guide rollers, and pillar-shaped guides are provided slightly behind the guide rollers and closer to the walls of the cassette.

When the cassette is loaded in the recording and reproducing unit to run the tape, the tape is run by drive power provided at the tape winding side. Therefore, if the tape wound on the hub on the tape winding side is slackened for some reason, the tape running speed abruptly changes. If the tape running speed abruptly changes, a so-called loop forming phenomenon sometimes occurs wherein a tape loop forms between the tape wound on the hub on the tape supplying side and the inner guide. The loop forming phenomenon often results in jamming. That is, if the loop formed is large, the tape may be caught up and wound on the hub on the tape supplying side, as a result of which the running of the tape is soon stopped.

Further, if the tape is wound on the hub displaced significantly in its widthwise direction and is stored for a relatively long time in that state, the tape becomes permanently deformed. If such a tape is used for recording or reproducing, the magnetic surface thereof cannot be brought into sufficient contact with the magnetic head, and accordingly difficulties such as level variations occur.

In view of the foregoing, an object of the invention is to provide a magnetic tape cassette in which the above-described loop forming phenomenon is prevented, and the tape is always wound on the hubs satisfactorily.

SUMMARY OF THE INVENTION

The foregoing object and other objects of the invention have been achieved by the provision of a magnetic tape cassette including a pair of hubs on which a magnetic tape is wound, two guide rollers provided at both ends of an opening formed in the front of the cassette, and two inner guides which are provided between respective ones of the guide rollers and the hubs, in which, according to the invention, each inner guide includes a cylindrical barrel with a tape sliding surface and having a protrusion with a tape sliding surface wider than the tape. The protrusion is turnable rearwardly of the cassette, and a tape guide groove is formed in the tape sliding surface of the cylindrical barrel, the tape guide groove being slightly wider than the tape. A stop for engaging the protrusion to limit the rotation of the inner guide is provided at a predetermined engagement position so that, at least on the tape winding side, the magnetic tape slides in the tape guide groove.

DESCRIPTION OF THE PREFERRED EMBODIMENTS

A preferred embodiment of the invention will be described with reference to the accompanying drawings.

Figure 1:
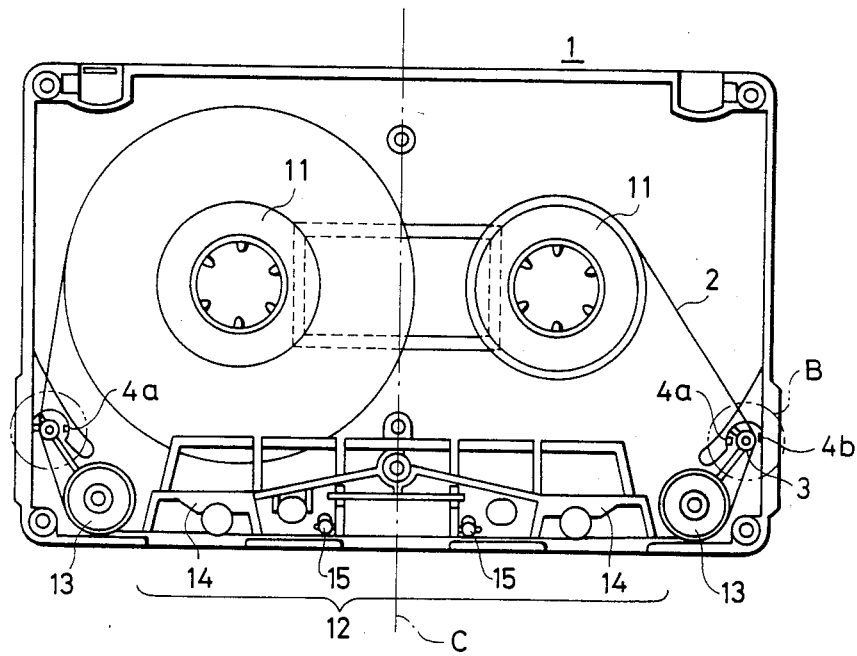
FIG. 1 is a plan view showing a preferred embodiment of a tape cassette of the invention.
Figure 2:
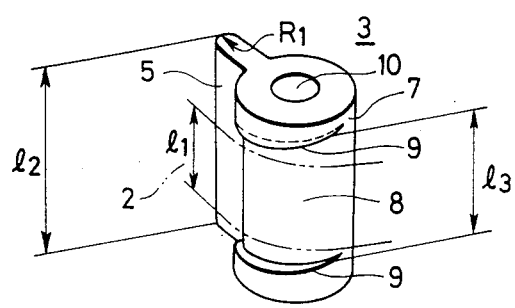
FIG. 2 is an enlarged perspective view showing an essential component of the embodiment of FIG. 1.
Figure 3:
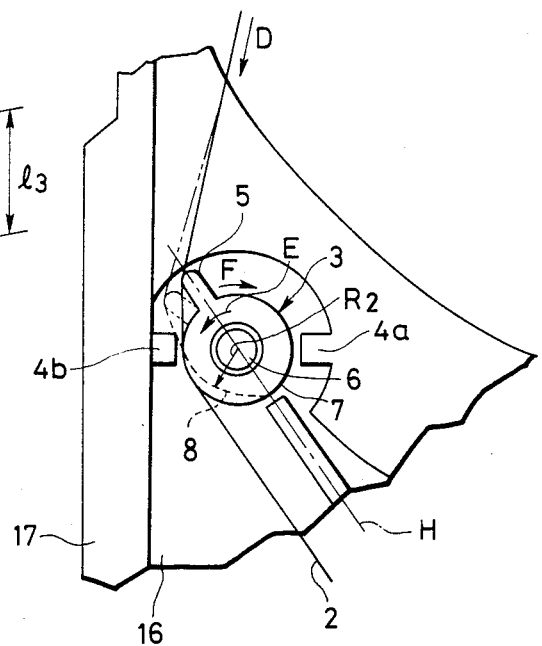
FIGS. 3 and 4 are enlarged plan views showing other essential components of the embodiment of FIG. 1.
Figure 4:
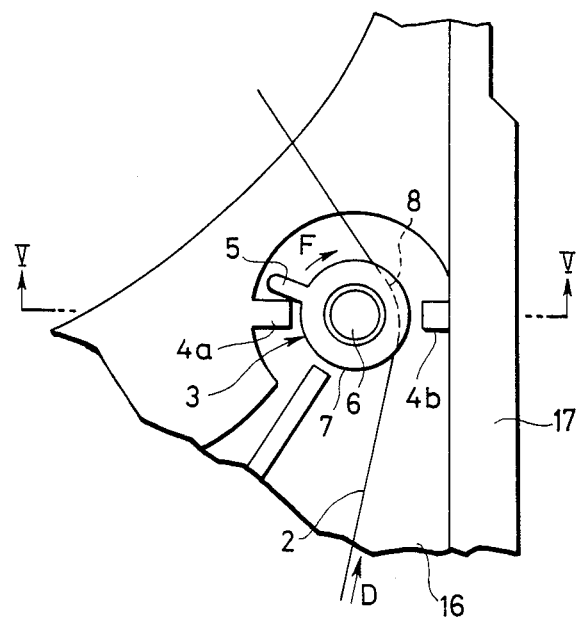
Figure 5:
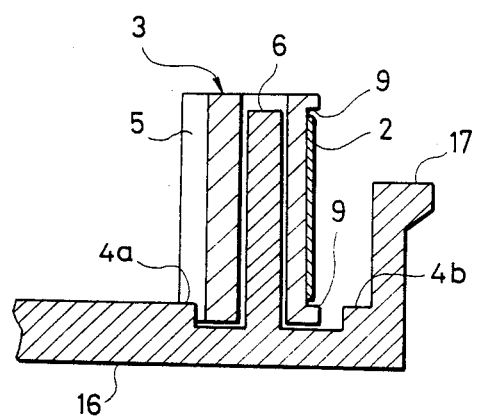
FIG. 5 is a sectional view taking in the direction of the arrows substantially along a line G—G in FIG. 4.

FIG. 1 is a plan view showing the inside of a magnetic tape cassette constructed according to the invention, FIG. 2 is an enlarged perspective view of an inner guide in the cassette of FIG. 1, FIG. 3 is an enlarged plan view showing a part A of FIG. 1, FIG. 4 is an enlarged plan view showing a part B of FIG. 1, and FIG. 5 is a sectional view taken in the direction of the arrows substantially along lines G—G in FIG. 4.

As shown in FIG. 1, a magnetic tape 2 wound on a pair of hubs 11 is laid in the cassette 1 and run in the ordinary manner while being guided by guide rollers 13 provided at either side of an opening 12 formed in the front of the cassette. M-shaped ribs 14 and head pins 15 are provided between the guide rollers 13, arranged symmetrically with respect to the center line C of the cassette. Inner guides 3 are provided behind respective ones of the guide rollers 13.

Each inner guide 3, as shown in FIG. 2, has a cylindrical barrel 7 with a hole 10. A protrusion 5 extends from the outer wall of the cylindrical barrel 7 and a tape guide groove 8 is formed in the outer wall of the barrel. More specifically, the protrusion 5 extends parallel to the rotational axis of the inner guide 3 and radially of the hole 10. The outer edge of the protrusion 5 has a width $l_2$ larger than the tape width $l_1$. The distance $l_3$ between the side walls 9 of the tape guide groove 8 is slightly larger than the tape width $l_1$. The tape guide groove 8 is shaped so that, with the protrusion 5 abutting against an inner stop 4a which limits the turning of the inner guide 3 as described below, the tape 2 slides along the tape guide groove 8. That is, the tape guide grooves 8 are formed in the inner guides 3 symmetrically with respect to the center lines H (FIG. 3).

In order for the outer edge of the protrusion to be maintained in smooth contact with the rear side of the tape, the horizontal section is provided with a suitable radius of curvature $R_1$. For the same reason, the tape sliding surface of the tape guide groove 8 has a suitable radius of curvature $R_2$ (FIG. 3).

The inner guides 3 are rotatably mounted on respective supporting shafts 6 (FIG. 5) protruding from the lower half 16 of the cassette 1 with the protrusions 5 being directed rearwardly of the cassette. An inner stop 4a and an outer stop 4b are formed on opposite sides of each supporting shaft 6 in such a manner that the stops and the supporting shaft are aligned parallel to the longitudinal axis of the cassette. The stops engage with the protrusion 5 to limit the amount of rotation of the inner guide 3.

The operation of the inner guides 3 during the running of the tape will be described.

When the tape 2 runs in the direction of arrow D in FIG. 3, the rear side of the tape 2 slides on the cylindrical barrel 7 with some amount of friction therebetween. Therefore, the inner guide 3 on the tape supplying side is forcibly turned in the tape running direction, and the outer edge of the protrusion 5 is brought into light contact with the rear side of the tape.

The hub 11 on the tape supplying side is rotated by the drive force on the tape winding side. Therefore, if the tape 2 wound on the tape winding side is slack when running of the tape is started, the hub 11 on the tape winding side is rotated at a higher speed than the ordinary speed. At this time, the hub on the tape supplying side does not rotate. However, as soon as the tape wound on the hub on the tape winding side is tightened, the drive force is abruptly transmitted from the tape winding side to the tape supplying side. As a result, the hub 11 on the tape supplying side is abruptly turned together with the tape, thus tending to form a loop due to inertia. This phenomenon is liable to occur especially when the tape 2 is fast forwarded or rewound.

However, such loop forming is prevented because, when the tape 2 slackens to form a tape loop between the tape wound on the hub on the tape supplying side and the inner guide 3, the guide 3 is made to turn in the direction of the arrow E in FIG. 3 so that the protrusion 5 displaces the tape running path towards the cassette side wall 17, thus absorbing the slack in the tape and preventing the formation of a loop. The outer stop 4b is used to prevent the inner guide 3 from being turned excessively in the direction of the arrow E.

On the other hand, in the inner guide on the tape winding side (FIG. 4), the protrusion 5 is abutted against the inner stop 4a due to sliding friction between the tape's rear side and the tape guide. Under this condition, the tape 2 slides along the tape guide groove 8. That is, the tape is wound on the hub 11 on the tape winding side while the upper and lower edges thereof are guided by the side walls 9 of the tape guide groove 8, that is, the displacement of the tape in its widthwise direction is prevented.

When the tape is run in the direction opposite the direction of the arrow D, the right and left inner guides 3 are turned in the direction of the arrows F (FIGS. 3 and 4), and the above-described function of the inner guides are exchanged—the right inner guide 3 operates in the same manner as the left inner guide 3 has operated while the left inner guide 3 operates in the same manner as the right inner guide 3 has operated.

As described above, the protrusion 5 extends rearwardly of the cassette to guide the running of the tape 2 while displacing the tape 2 outwardly. Therefore, the tape jamming phenomenon and the loop forming phenomenon due to slackening of the tape are prevented with the use of the invention.

On the tape winding side, the side walls 9 forming the tape guide groove 8 prevent the displacement of the tape in its widthwise direction immediately before the hub 11. Accordingly, the tape 2 is regularly wound on the hub 11. Therefore, the difficulty of the tape being deformed due to irregular winding is prevented.

In the above-described embodiment, the tape guide grooves 8 are formed so that the position of the tape 2 in its widthwise direction is regulated only on the tape winding side. However, if the tape guide grooves 8 are made larger circumferentially of the cylindrical barrels 7, then the position of the tape 2 in the widthwise direction can be regulated also on the tape supplying side.

We claim:

1. In a magnetic tape cassette including a pair of hubs on which a magnetic tape is wound, two guide rollers, one provided at either end of an opening formed in the front of said cassette, and two inner guides, one provided between each said guide rollers and a respective one of said hubs, the improvement wherein each inner guide comprises:

a cylindrical barrel having a tape sliding surface, a protrusion having a tape sliding surface wider than said tape, said protrusion being turnable rearwardly of said cassette, and a tape guide groove formed in said tape sliding surface of said cylindrical barrel, said tape guide groove being slightly wider than said tape; and a stop for engaging said protrusion to limit the rotation of said barrel provided at a predetermined engagement position so that, at least on a tape winding side of said cassette, said magnetic tape slides in said tape guide groove.

2. The magnetic tape cassette of claim 1, wherein said protrusion has a rounded end having a radius of curvature less than a radius of curvature of said tape guide groove.

3. The magnetic tape cassette of claim 1, further comprising, for each said inner guide, a second stop, said second stop being positioned for engaging said protrusion to limit the rotation of said barrel on a tape supplying side of said cassette so that said protrusion engages said tape when said tape slackens on said tape winding side, said second stop being provided on an adjacent side wall of said cassette.

* * * * *

UNITED STATES PATENT AND TRADEMARK OFFICE
CERTIFICATE OF CORRECTION

PATENT NO. : 4,575,023
DATED : March 11, 1986
INVENTOR(S) : Komiyama et al

It is certified that error appears in the above-identified patent and that said Letters Patent is hereby corrected as shown below:

ON THE FRONT PAGE:

Please include the Assignee --FUJI PHOTO FILM CO., LTD.--.

Signed and Sealed this

Twenty-ninth Day of July 1986

[SEAL]

Attest:

Attesting Officer

DONALD J. QUIGG

Commissioner of Patents and Trademarks